United States Patent
Lopez Casanova et al.

(10) Patent No.: US 10,927,043 B2
(45) Date of Patent: Feb. 23, 2021

(54) LIGHTWEIGHT AND/OR THERMALLY INSULATING STRUCTURAL CONCRETES HAVING A HIGHER RESISTANCE/DENSITY AND/OR RESISTANCE/CONDUCTIVITY RATIO, AND METHODS FOR THE PRODUCTION THEREOF

(71) Applicant: PONTIFICIA UNIVERSIDAD CATOLICA DE CHILE, Santiago (CL)

(72) Inventors: Mauricio Alejandro Lopez Casanova, Santiago (CL); Jose Carlos Remesar Lera, Santiago (CL); Sergio Eduardo Vera Araya, Santiago (CL)

(73) Assignee: Pontificia Universidad Catolica de Chile, Santiago (CL)

( * ) Notice: Subject to any disclaimer, the term of this patent is extended or adjusted under 35 U.S.C. 154(b) by 0 days.

(21) Appl. No.: 16/344,221

(22) PCT Filed: Oct. 18, 2017

(86) PCT No.: PCT/CL2017/050059
§ 371 (c)(1),
(2) Date: Apr. 23, 2019

(87) PCT Pub. No.: WO2018/076126
PCT Pub. Date: May 3, 2018

(65) Prior Publication Data
US 2019/0263721 A1  Aug. 29, 2019

(30) Foreign Application Priority Data

Oct. 24, 2016 (CL) .................................. 02703-2016

(51) Int. Cl.
| | |
|---|---|
| *C04B 28/04* | (2006.01) |
| *B28C 7/02* | (2006.01) |
| *C04B 14/06* | (2006.01) |
| *C04B 14/12* | (2006.01) |
| *C04B 14/20* | (2006.01) |
| *C04B 18/08* | (2006.01) |
| *B28C 7/04* | (2006.01) |
| *B28C 5/00* | (2006.01) |
| *C04B 28/00* | (2006.01) |
| *C04B 111/00* | (2006.01) |
| *C04B 111/40* | (2006.01) |

(52) U.S. Cl.
CPC ............... *C04B 28/04* (2013.01); *B28C 5/00* (2013.01); *B28C 7/02* (2013.01); *B28C 7/024* (2013.01); *B28C 7/04* (2013.01); *C04B 14/062* (2013.01); *C04B 14/12* (2013.01); *C04B 14/202* (2013.01); *C04B 14/204* (2013.01); *C04B 18/08* (2013.01); *C04B 28/00* (2013.01); *C04B 2111/00448* (2013.01); *C04B 2111/00646* (2013.01); *C04B 2111/40* (2013.01); *C04B 2201/20* (2013.01)

(58) Field of Classification Search
CPC .. B28C 5/00; B28C 7/02; B28C 7/024; B28C 7/04; C04B 14/062; C04B 14/12; C04B 14/202; C04B 14/204; C04B 18/08; C04B 28/00; C04B 28/04; C04B 2111/00448; C04B 2111/00646; C04B 2111/40; C04B 2201/20
See application file for complete search history.

(56) References Cited

U.S. PATENT DOCUMENTS

| | | | |
|---|---|---|---|
| 4,268,317 A * | 5/1981 | Rayl ....................... | C04B 14/16 106/672 |
| 8,394,192 B2 * | 3/2013 | Meille .................... | C04B 28/02 106/705 |
| 9,353,008 B2 * | 5/2016 | Shink ................... | C04B 38/0067 |
| 2013/0145967 A1 | 6/2013 | Koehler et al. | |

FOREIGN PATENT DOCUMENTS

| | | | | |
|---|---|---|---|---|
| KR | 20160015475 A | | 2/2016 | |
| WO | WO-2015020612 A1 * | | 2/2015 | ............. C04B 28/34 |

OTHER PUBLICATIONS

Pieralisi, R. | "Characterization and modelling of pervious concrete. Dpto Ing. Construccion." Tesis Doctoral, Universidad Politecnica de Cataluna. https://vmw.researchgate.net/profile/Ricardo_Pieralisi/publication/308891788_Characterization_and_modelling_ofpervious_concrete/links/57f5405408ae280dd0b8dc78/Characterization-and-modelling-of-pervious-concrete.pd[2016].

(Continued)

*Primary Examiner* — Anthony J Green
(74) *Attorney, Agent, or Firm* — Adams and Reese LLP

(57) ABSTRACT

A disclosed structural and light concrete includes a binding matrix and light aggregates. The binding matrix has a volume fraction from approximately 20% to approximately 50% of a concrete total volume and include: (1) a Portland Type I, II, III, IV or V cement or a mixture thereof, in a dose of at least 100 kg/m3 of concrete; (2) supplementary cementitious materials in a proportion of up to 4 times by volume of Portland cement; (3) a water component having a volume fraction relative to cement and supplementary cementitious materials in a range from approximately 0.2 to approximately 0.7; and (4) a maximum volume fraction of calcium hydroxide (CH) of approximately 10%. The light aggregates correspond to a volume fraction a range from approximately 30% to approximately 80% of the total concrete volume. Properties include increased compression resistance, decreased density, lower thermal conductivity and higher quotient of density resistance.

16 Claims, 2 Drawing Sheets

References Cited

OTHER PUBLICATIONS

Chung, S.Y. et al. | "Investigation of characteristics and responses of insulating cement paste specimens with aersolid using Xray micro computed tomography". Construction and Building Materials, (Apr. 2016), No. 118, pp. 204-215.

Wu, Y. et al | "Development of ultra lightweight cement composites with low thermal conductivity and high specific strenght for energy efficient buildings". Construction and Building Materials, (2015), No. 87, pp. 100-112.

Hilal, A. A. et al. | "On Entrained Pore Size Distribution of Foamed Concrete". Construction and Building Materials (2015), No. 75, pp. 227-233.

Wei, S. et al. | "Characterization and Simulation of microstructure and thermal properties of foamed concrete". Construction and Building Materials, (2013), No. 47 pp. 1278-1281.

Chung, S.C. et al. | "Pore Characteristics and Their Effects on the Material Properties of Foamed Concrete Evaluated Using Micro-CT Images and Numerical Approaches". Appl. Sci. (2017), 7(6), p. 550.

\* cited by examiner

LIGHTWEIGHT AND/OR THERMALLY INSULATING STRUCTURAL CONCRETES HAVING A HIGHER RESISTANCE/DENSITY AND/OR RESISTANCE/CONDUCTIVITY RATIO, AND METHODS FOR THE PRODUCTION THEREOF

CROSS-REFERENCE TO RELATED APPLICATIONS

This application is a national stage entry under 35 U.S.C. 371 of PCT Patent Application No. PCT/CL2017/050059, filed Oct. 18, 2017, which claims priority to Chilean Patent Application No. 02703-2016, filed Oct. 24, 2016, the entire contents of each of which is incorporated herein by reference.

FIELD

This disclosure relates to industries related to cement, particularly related to the design, manufacture and attainment of a concrete for reinforced mixed in-situ concrete structures, premixed or in use of prefabrication technologies, also for structures in concrete without reinforcement as in masonry blocks and foundations, used in the construction of housing and height structures and infrastructure in general. The object of the disclosure consists of a structural concrete, lightweight and of low thermal conductivity and its method of manufacture.

BACKGROUND

Background Around Energy Efficiency and Thermal Insulation of Buildings:

Currently, the energy efficiency of homes and workspaces has become relevant and we are looking to reduce their energy consumption. In addition, concrete is the most used construction material in the world, given its architectural, structural and construction features. However, the thermal conductivity of conventional concrete is high and, in most climates, it is insufficient to provide adequate thermal resistivity often requiring additional thermal insulation in houses built with these materials. In order to avoid and to simplify the construction of these houses, depending on the environment in which they are located, it is sought to develop and produce a concrete that has a sufficient compressive strength so that it can have a structural function and, at the same time, have a thermal conductivity sufficiently low. Therefore, in addition to the qualities traditionally sought in a concrete, such as workability, constructability and resistance to compression, it is sought to develop and produce a structural concrete with low thermal conductivity that can replace the existing materials and used in structures with a compressive strength of at least 10 MPa and a thermal conductivity less than 0.288 W/(m*K) (watts per meter per Kelvin degree) to be considered as a good insulator. It should be noted that a thermal conductivity between 0.288 and 0.721 W/(m*K) is considered as a moderate insulator and a thermal conductivity greater than 0.721 W/(m*K) as a poor insulator. For example, solid ceramic bricks may have a minimum thermal conductivity of 0.8 W/(m*K) and hollow ceramic bricks a minimum thermal conductivity of 0.75 W/(m*K) corresponding to poor insulators and a compressive strength around 8 MPa. So it is sought to produce a concrete with a balanced compromise between thermal conductivity and compressive strength, being a good thermal insulator and with a minimum of resistance to compression, being superior to ceramic bricks.

Background Around the Own Weight of Structural Elements and of Buildings:

The own weight of the structural elements and, therefore, the density of the materials used define the structural capacity of the element to a great extent. This is because the structural element, such as a concrete wall, must always resist its own weight in addition to the loads imposed in the design. Therefore, a material used will be more competitive to the extent that its ability to resist additional loads increases, which can be achieved with an increase in its strength and/or a decrease in its own weight. This factor becomes more relevant when considering the effect that a lower own weight of the structural elements can have in the reduction of the seismic solicitations and the size of the foundations. This factor is even more relevant when working with prefabricated concrete technologies, where transport and assembly costs are proportional to the weight of these elements.

Therefore, in addition to the qualities traditionally sought in a concrete, such as workability, constructability and resistance to compression, it is sought to develop and produce a structural concrete and low density that can replace existing materials and used in building structures in height and infrastructure in general, where the low weight implies an advantage, with a cylindrical compressive strength of at least 20 MPa and a density less than 1.2 t/m$^3$ (tons per meter per cubic meter). It should be noted that a concrete with a low density of 1.85 t/m$^3$ is considered as a lightweight concrete.

Background Around the Balance Between Mechanical and Physical Properties:

For the purpose of evaluating this compromise between mechanical and physical properties, two quotients are defined: a thermal conductivity resistance quotient and another density resistance quotient and they are defined as:

$Q\sigma/\lambda$, =Compressive strength (at 28 days of age)/thermal conductivity, in (MPa*m*K)/W (Megapascal, meter and Kelvin degree per Watt) whereby the masonry brick has a quotient $Q\sigma/\lambda$, =10 (MPa*m*K)/W and conventional concrete has a quotient between $Q\sigma/\lambda$, =15 and 45 (MPa*m*K)/W.

$Q\sigma/p$=Compressive strength (at 28 days of age)/density, in (MPa*m$^3$)/t (Megapascal, cubic meter per ton) whereby conventional concrete has a quotient between $Q\sigma/p$=10 and 18 (MPa*m$^3$)/t.

Different types of concrete are known, such as lightweight concrete with low thermal conductivity. For example US2010/021551 discloses a lightweight concrete formulation capable of providing sufficient compressive strength for structural concrete and low thermal conductivity. It is indicated that conventional concrete has a thermal conductivity at 23° C. and 50% relative humidity of 1.3 to 2.1 W/(m*K) (watts per meter per Kelvin degree) and that light, structural and conventional concretes have a thermal conductivity generally greater than 0.8 W/(m*K) for the same conditions, that is to say, they correspond to a poor insulator. This document discloses an example of concrete manufactured with a thermal conductivity of 0.52 W/(m*K), that is to say, a moderate insulator and with a resistance to compression (at 28 days of age measured in cylindrical test pieces) of 29 MPa which greatly exceeds the masonry brick, with a quotient $Q\sigma/\lambda$, =55.8 (MPa*m*K)/W. However, the concrete developed in said document does not achieve satisfactory thermal performance to be considered as a good insulator.

Another type of concrete with a low thermal conductivity is known, produced mainly with a degree of porosity within the aggregates. This type of concrete usually has too low a compressive strength to be used in the masonry structure. For example US2013/098270 describes producing an example of concrete with a thermal conductivity of 0.163 W/(m*K), that is to say, a good insulator but a compressive strength (at 28 days of age) of only 8.5 MPa, which is similar to ceramic brick, which implies a quotient of conductivity resistance of $Q\sigma/\lambda$, =50.06 (MPa*m*K)/W, it is considered that the compressive strength is not enough to replace and improve the masonry building with, for example, ceramic bricks. It is sought to produce a concrete that is a good insulator but improves the resistance to compression.

Background Around the Microstructure:

Concrete can be considered as a two-phase composite material: a binding matrix that is prepared as a cement paste, typically a hydrated Portland cement paste and aggregates, such as gravel and sand, in the form of coarse or fine particles that are incorporated into said paste by a mixture that is then placed in molds (formwork) and allowed to harden in different ways according to the type of concrete and the type of construction used (reinforced mixed in-situ concrete, premixed or in use of prefabrication technologies and structures in concrete with passive, active or without reinforcement as blocks for masonry).

With regard to the concrete matrix, this is the phase that provides the mechanical resistance to the material, agglomerating the aggregates. The main hydration products in the matrix is a cementitious paste with hydrated calcium silicates (CSH) (50-60% by weight), calcium hydroxide (CH) (20-25% by weight) and not hydrated cement (3 to 8%).

The matrix constituted from the CSH has a structure that varies from a low degree of crystallinity to a reticular network, unlike CH and Portland cement phases (tricalcium silicates, dicalcium silicates, tricalcium aluminates and tetracalcium ferroaluminates), which have a crystalline structure. Being of low degree of crystallinity, it is estimated that CSH has a lower thermal conductivity than CH and non-hydrated Portland cement phases. In addition, the CSH provides the agglomeration and mechanical strength capacity to the concrete. It is known that in the presence of supplementary cementitious materials and water availability, the CH is transformed into CSH and a reduction of the non-hydrated Portland cement is promoted. Therefore, it is sought to minimize the amount of CH, not hydrated Portland cement and to obtain a greater amount of CSH for a matrix with amorphous phase allowing to contribute to the mechanical strength and at the same time decreasing the thermal conductivity of the concrete. Additionally, it is sought to use most of the water initially contained in the binding matrix, in order to empty the pores inside which contain water and alkalis (pore solution) and to replace them with air. Indeed, the optimization of the matrix components generates changes in the pulp microstructure, which in turn have an impact on the compressive strength and thermal conductivity.

On the other hand, the porosity of the light aggregates decreases the thermal conductivity of the concrete, since the encapsulated air is a good thermal insulator. However, not all pores have the same effect on thermal conductivity and mechanical strength. Then, the aim is to obtain a pore refinement, to maximize the spatial distribution of pores, to minimize the maximum pore size and to minimize the moisture content inside the pores of the concrete and to achieve an amorphous binding matrix allowing to reduce the thermal conductivity of the produced concrete.

Technical Problem

In the disclosure, it is sought to design and produce concretes having a balance between physical and mechanical properties significantly superior to those currently existing. For example, a concrete sufficiently resistant to compression, greater than 9 MPa to be able to overcome the ceramic brick in masonry structures, with a thermal conductivity allowing to be a good thermal insulator, lower than 0.288 W/(m*K) but with a good compromise between both properties measurable with the quotient $Q\sigma/\lambda$, and that is, for example, greater than 60 (MPa*m*K)/W. In another example, a sufficiently strong concrete for building in height with a compressive strength greater than 25 MPa and with a density lower than 1 t/m$^3$ but with a good compromise between strength and density and, for example, a quotient $Q\sigma/p$ greater than or equal to 15 (MPa*m$^3$)/t.

Technical Solution

The lightweight concrete and thermal insulation of the disclosure is a material in which its main phases (matrix and aggregates) have been optimized in order to significantly reduce the thermal conductivity and/or the density with the least possible detriment in the mechanical strength, thus increasing their respective quotients $Q\sigma/\lambda$, and/or $Q\sigma/p$ over the ranges typically present in concrete.

The density of the concrete and its thermal conductivity decreases with increasing total volume of pores with air. The thermal conductivity of the air decreases as the size of the pores inside it containing said air, decreases. Therefore, the decrease in the distribution of the pore size in the concrete allows to reduce the thermal conductivity by decreasing the thermal bridges through the matrix, considering concretes of equal total porosity.

The mechanical strength of the concrete tends to decrease when the total volume of pores inside increases, however this decrease is ruled by the distribution of the pores inside. This refers to both the spatial distribution of the pores and their size, this refers specifically to the distribution of the pores between the phases of the coarse aggregate, the fine aggregate and the binding matrix and also to the distribution of said porosity in relation to the pore size inside it.

In the lightweight concrete and thermal insulation of the disclosure, the binding matrix has a higher thermal conductivity than the aggregates, so the heat flows mostly through it, thus controlling the thermal conductivity of the concrete. Considering the above, the binding matrix according to this disclosure has a considerably lower thermal conductivity than conventional concrete and lightweight concrete matrices. This is achieved by obtaining a binding matrix of amorphous microstructure (minimizing its crystallinity) and a maximum of air in the pores (minimizing the volume of pore solution). Obtaining an amorphous binding matrix further contributes to an increase in the mechanical strength of the latter and, therefore, of the concrete as a whole.

The synergy between the amorphous structure of the binding matrix in a hardened state, its air content versus the pore solution, together with a homogeneous distribution of these and the selection of the aggregates according to the refinement of its present pores, allows the concrete of the disclosure to have a thermal conductivity less than or equal to 0.19 W/(m*K), a density less than or equal to 1.4 t/m$^3$ and a cylindrical compression strength greater than or equal to 10 MPa. This even allows a quotient of conductivity resistance of greater than $Q\sigma/\lambda, =70$ (MPa*m*K)/W and a quotient of density resistance $Q\sigma/\rho$ greater than 25 (MPa*m³/t).

Advantages of the Disclosure

With the concrete of the disclosure a sustainable construction of high thermal and acoustic comfort is allowed. Additionally, the construction process is similar to that of a conventional concrete, being the time of construction and costs lower compared to conventional concrete walls with an interior or exterior insulation.

The disclosed concrete allows to replace the masonry with a product of greater resistance to compression and lower thermal conductivity.

Additionally, the porous structure of the concrete and the mainly amorphous binding matrix and mostly with air instead of pore solution, allows a better acoustic absorption and a better fire resistance.

SUMMARY

This disclosure provides of a method for manufacturing a structural concrete, lightweight and/or with low thermal conductivity including the stages of analyzing the pores of the aggregates and the crystalline phase of the binding matrix and selecting the aggregates and the mixture for the binding matrix according to defined criteria.

The disclosure provides a structural concrete, lightweight and low thermal conductivity, consisting of:
  a) a binding matrix corresponding to a range of 20-50% by volume of the total volume of the concrete, comprising:
    i. a Portland Type I, II, III, IV or V cement, or a mixture thereof, according to ASTM C 150, in a dose of at least 100 kg/m³ of concrete;
    ii. supplementary cementitious materials in a volumetric proportion of up to 4 times by volume of Portland cement;
    iii. with a quotient (in volume) of water to cement and supplementary cementitious materials in a range of 0.20-0.70;
    iv. a maximum volume of calcium hydroxide (CH) of 10%; and
  b) aggregates corresponding to a range between 30-80% of the total volume of concrete;
wherein the concrete has a resistance to compression, after 28 days of age, of at least 10 MPa, a density lower than 1.4 t/m³, a thermal conductivity lower than 0.288 (at 23° C. and 50% of relative humidity), a quotient of conductivity resistance of at least $Q\sigma/\lambda=60$ (MPa*m*K)/W and a quotient of density resistance $Q\sigma/\rho$ of at least 17 (MPa*m³/t).

DETAILED DESCRIPTION

Figure 1:
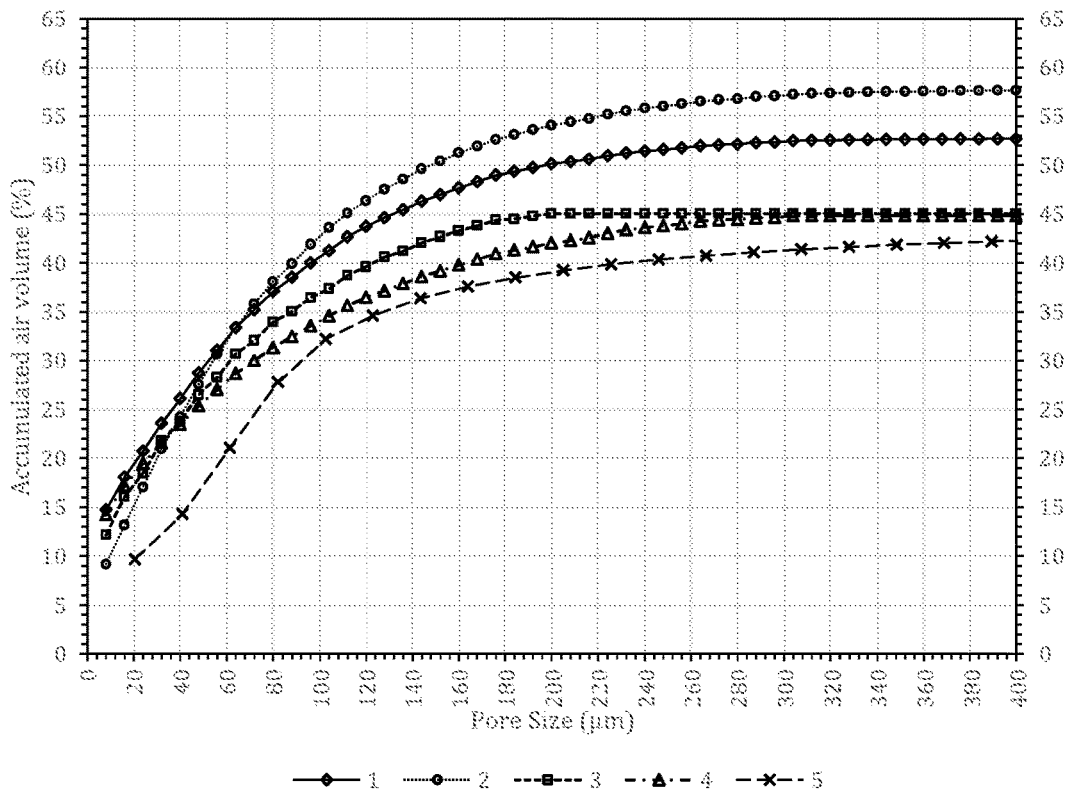
FIG. 1 illustrates a diagram of the distribution of pores volume provided by the light aggregates in the concrete according to the pore size, according to an embodiment of the disclosure.

The disclosure provides lightweight structural concretes and thermal insulators that have quotients $Q\sigma/\lambda$, and/or $Q\sigma/\rho$ higher than those of conventional concrete or existing lightweight concrete and its method of obtaining it. It allows to obtain a concrete with structural strength and superior to that of ceramic bricks and characteristics of good thermal insulation. Likewise, it is possible to obtain a concrete with compressive strength of structural range according to the ACI318 standard and with densities lower than 1.0 t/m³.

According to an embodiment, the structural lightweight and heat insulating concretes have a quotient $Q\sigma/\lambda$ greater than 60 (MPa*m*K)/W, preferably greater than 70 (MPa*m*K)/W.

The present disclosure also consists of lightweight structural concretes having a quotient $Q\sigma/\rho$ greater than 17 (MPa*m³/t), preferably greater than 25 (MPa*m³/t).

The parameters of the criteria indicated below are determining factors in the physical behavior related to the density, mechanical behavior and/or thermal conductivity of concrete, these parameters are used in the method of the present disclosure.

According to an embodiment, the method of manufacturing lightweight structural concretes and thermal insulation includes the following stages:
  a. Providing aggregates that can include amorphous components and a dosage of a binding matrix for the concrete; said dosage consists of the water/cementitious matrix material ratio and should be in the range 0.20-0.70;
  b. Performing an analysis of the lightweight aggregates and said amorphous components present per size fraction by measuring the pore size distribution of each fraction;
  c. Performing an analysis of the binding matrix, measuring its CH content and pore volume;
  d. Defining the absolute and relative amount of the aggregate fractions in order to meet the following requirements: for pore sizes of up to 10 μm, a minimum volume of distributed air volume of 15% and a minimum accumulated air content of 10% must be present; for pore sizes of up to 40 μm, there must be a minimum content of distributed air volume of 50% and a minimum cumulative air content of 20%; for pore sizes of up to 100 μm, a minimum content of distributed air volume of 75% and a minimum cumulative air content of 30% must be present; for pore sizes of up to 200 μm, a minimum distributed air volume content of 90% and a cumulative minimum air content of 40% must be maintained; for pore sizes of up to 300 μm, a minimum distributed air volume content of 100% and a minimum cumulative air content of 43% must be achieved;
  e. Considering the analysis carried out in stages b) and c) and to evaluate if the following criteria are met:
    i. a total volume of air in the selected light aggregates between 50% and 99%;
    ii. a total volume of air in the concrete provided by the light aggregates between 25% and 75%;
    iii. a maximum volume of binding matrix of 50% of the concrete total volume;
    iv. a total volume of pores in the binding matrix of 10-30% with respect to the matrix total volume;
    v. a maximum percentage of CH in the binding matrix of 10%;
  f. If these criteria are not met, repeating stages a) to e), if these criteria are met, selecting the analyzed aggregates and the dosage for the binding matrix analyzed as the selected components of light structural concrete and with low thermal conductivity; and g. Manufacturing a concrete with said candidate aggregates and said candidate matrix according to said dosage, as it is known in the state of the art.

According to an embodiment of the present disclosure, said analysis of the light aggregates in stage b) is carried out by measuring the porosity distribution by computed tomography (CT scan). This test allows to analyze in 3D the volume and distribution of pores greater than 1 µm (it depends on the particle size). The air volume of pores smaller than 1 µm is calculated by the difference in porosity measured by CT scan and the total porosity of the aggregate measured according to ACI213.

According to an embodiment of the present disclosure, said analysis of the other amorphous components in stage b) is measured from the porosity distribution by CT scan and its thermal conductivity is measured. The thermal conductivity of these must be 0.2 W/mK maximum.

According to an embodiment of the present disclosure, said analysis of the binding matrix in stage c) by measuring its CH content and pore volume, is carried out by measuring the content of the hydration products by simulations and samples of candidate binding matrices are analyzed by XRD, XRF and/or TGA.

According to an embodiment of the present disclosure, it is recommended that the smaller aggregate have a size of at least half of the largest fraction of said aggregate.

According to another object of the present disclosure, a method of manufacturing lightweight structural concretes includes the following stages:
a. Providing aggregates that may include amorphous components and a dosage of a binding matrix for the concrete, said dosage consists of the water/cementitious matrix material ratio and should be in the range 0.20-0.50;
b. Performing an analysis of the lightweight aggregates and said amorphous components present per size fraction by measuring the pore size distribution of each fraction;
c. Performing an analysis of the binding matrix by measuring its mechanical strength;
d. Defining the absolute and relative amount of the aggregate fractions in order to meet the following requirements: for pore sizes of up to 10 µm, a minimum content of 15% of distributed air volume must be present; for pore sizes of up to 40 µm, a minimum distributed air volume content of 50% must be available; for pore sizes of up to 100 µm, a minimum distributed air volume content of 75% must be available; for pore sizes of up to 200 µm, a minimum distributed air volume content of 90% must be available; for pore sizes of up to 300 µm, a minimum distributed air volume content of 100% must be available;
e. Considering the analysis carried out in stages b) and c) and to evaluate if the following criteria are met:
  i. a total volume of air in the selected light aggregates between 30% and 99%;
  ii. a total volume of air in the concrete provided by the lightweight aggregates between 15% and 75%;
  iii. a maximum volume of binding matrix of 50% of the total volume of the concrete;
f. if these criteria are not met, repeating stages a) to e), if these criteria are met, selecting the aggregates analyzed and the dosage for the binding matrix analyzed as the selected components of the light structural concrete; and
g. Manufacturing a concrete with said candidate aggregates, said candidate matrix and said dosage, as it is known in the state of the art.

According to an embodiment and similarly to the method for manufacturing lightweight structural concrete and thermal insulation previously described, said analysis of the lightweight aggregates in stage b) is carried out by measuring the porosity distribution by means of CT scan.

According to an embodiment of the present disclosure, said analysis of the other amorphous components in stage b) is measured from the porosity distribution by CT scan and its thermal conductivity is measured. The thermal conductivity of these must be 0.2 W/mK maximum.

Table 1 summarizes the aggregates conditions to be fulfilled in stage d) of the concrete manufacturing methods according to the disclosure, in absolute and relative amount of the aggregates fractions:

TABLE 1

Criteria for air volume and distribution of aggregates

| Pore size (µm) | Minimum volume content of air distributed (%) | Minimum cumulative air content (%) |
|---|---|---|
| 10 | 15% | 10% |
| 40 | 50% | 20% |
| 100 | 75% | 30% |
| 200 | 90% | 40% |
| 300 | 100% | 43% |

For the present disclosure, the matrix cementitious materials considered are Portland Cement Type I, II, III, IV, V or a mixture thereof, according to ASTM C 150 standard. In fact, the matrix may be composed by Portland cement, supplementary cementitious materials, chemical additives and water. The additional cementitious materials considered are: fly ash, micro silica, nano silica, pozzolan, natural, calcined clay, blast furnace slag, calcined shale, rice husk ash, wood waste ash or a mixture thereof and other materials that generate a pozzolanic reaction due to their content of silicates or aluminates.

The chemical additives considered are such as plasticizers, high-range plasticizers, air-entrainers, setting time (accelerating or retarding) modifiers, viscosifiers, shrinkage reducers, hydration facilitators, curing agents, either based on carboxylates, oleates, sulfonates, cellulose, styrenes-butadienes, among others typically used in concrete.

The aggregates considered are light aggregates and other aggregates of amorphous structure. As a whole, they include the aggregates of the concretes of the present disclosure. The lightweight aggregates have a higher porosity than the natural stone aggregates that are conventionally used. They can be of natural origin (pumice stone, vermiculite) or industrially produced (fly ash, micro silica, nano silica, pozzolana, natural, calcined clay, blast furnace slag, calcined shale, rice husk ash, glass). It is desired that the raw material of the aggregate is based on an amorphous material instead of a crystalline material, since the former normally have a lower thermal conductivity.

Other considered components of amorphous structure are thermoplastic polymers, elastomers or fibers, such as polystyrene, rubber, polypropylenes or acrylonitrile butadiene styrene. These components decrease the thermal conductivity of the concrete due to the low thermal conductivity they have, less than 0.2 W/mK.

The aggregates can be:

a) Artificial light aggregates: prepared by expansion, pelletization, sintering or other method, such as expanded clay, expanded shale, expanded slate, expanded perlite, expanded glass, vermiculite, diatomite, fly ash, blast furnace slag, glass microspheres, cenospheres, among others;

b) Natural light aggregates: pumice stone, vermiculite, diatomite, among others;

c) Thermoplastic polymers, elastomers or fibers, such as polystyrene, rubber, polypropylenes or acrylonitrile butadiene styrene.

Next, the present disclosure is illustrated by an example. This example should be understood as illustrative of the present disclosure and it is not intended to restrict the disclosure in any way.

Examples

Herein, Table 2 discloses examples of the present disclosure. The concretes 1, 3 and 4 were designed according to the method to obtain lightweight structural concretes and thermal insulators according to an embodiment. The concrete 3 was designed according to the method of manufacturing a lightweight structural concrete according to an embodiment. Concretes 2 and 5 are used to compare the effectiveness of the method. The aggregates of expanded clay and expanded glass are in the superficially dried saturated state (SSS), for which it was immersed in water for 24 hrs and then taken to the SSS condition.

TABLE 2

Dosages of concretes

| | Concrete | | | | |
|---|---|---|---|---|---|
| | 1 | 2 | 3 | 4 | 5 |
| Cement | 170 | 240 | 285 | 285 | 334 |
| FA (fly ash) | 192 | 145 | 172 | 172 | 0 |
| SF (microsilica) | 0 | 34 | 40 | 40 | 0 |
| Water | 145 | 167 | 199 | 199 | 132 |
| Superplasticizer | 1.80 | 2 | 2.30 | 2.30 | 0.67 |
| Normal sand | 0 | 0 | 0 | 0 | 214 |
| Expanded clay φ 0-5 mm | 0 | 0 | 0 | 0 | 297 |
| Expanded clay φ 10-20 mm | 0 | 0 | 0 | 0 | 400 |
| Expanded shale φ 10-20 mm | 0 | 0 | 0 | 0 | 0 |
| Expanded glass φ 0.1-0.3 mm | 160 | 0 | 117 | 0 | 0 |
| Expanded glass φ 0.25-0.5 mm | 0 | 90 | 90 | 0 | 0 |
| Expanded glass φ 0.5-1 mm | 123 | 50 | 54 | 270 | 0 |
| Expanded glass φ 1-2 mm | 84 | 62 | 86 | 0 | 0 |
| Expanded glass φ 2-4 mm | 69 | 92 | 0 | 0 | 0 |

Figure 2:
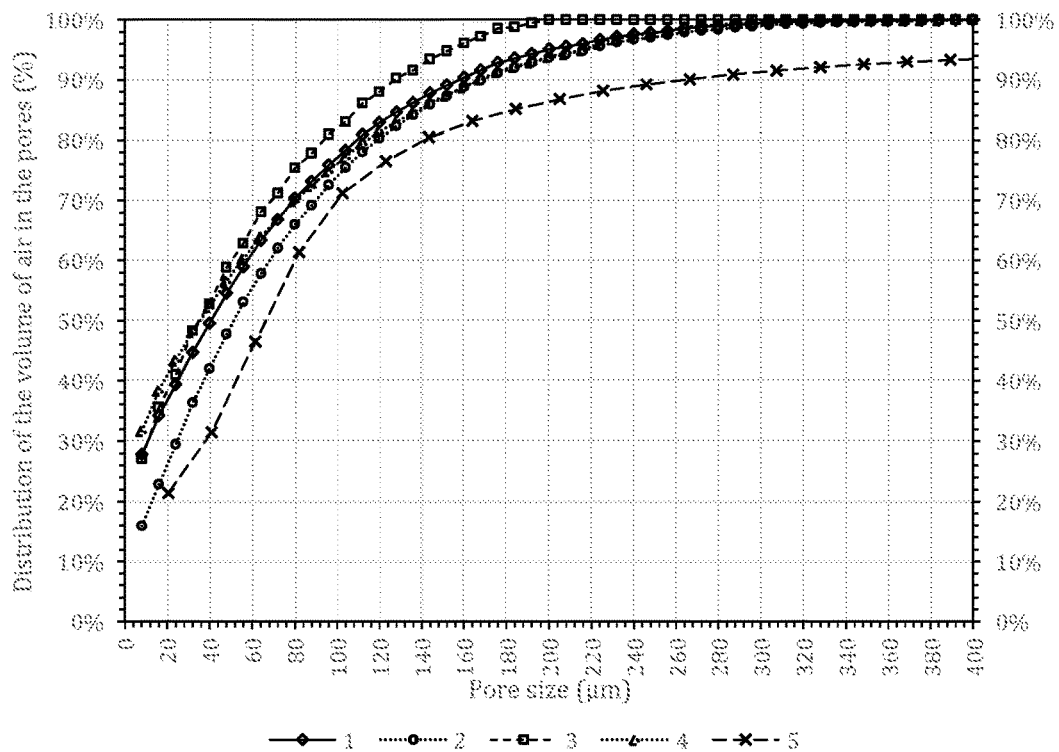
FIG. 2 shows the distribution of the volume of air in the pores according to the pore size for concrete with different lightweight aggregates, according to an embodiment of the disclosure.
Figure 3:
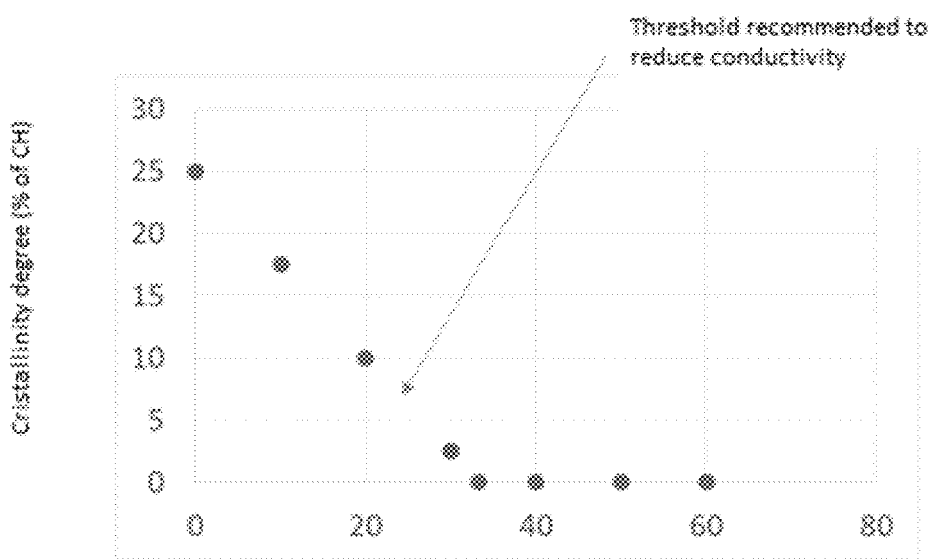
Figure 4:
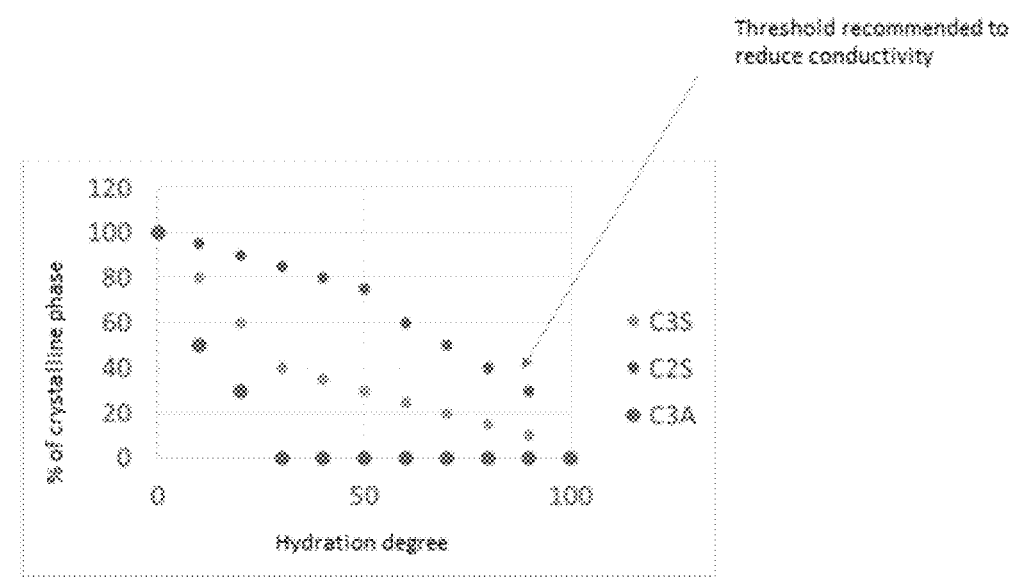

It can be seen in FIGS. 1 and 2 that, using the manufacturing method of the present disclosure, concretes 1, 3 and 4 meet the requirements of Table 1.

On the other hand, concrete 2 meets the requirements of the minimum content of the distributed volume of air, but does not comply with the minimum volume of accumulated air. Concrete 5 does not meet any of the above requirements. Concretes 3, 4 and 5 have a similar total air content, as can be seen in Table 3. However, in FIG. 1 and Table 3 it can be seen that a greater refinement of the accumulated air volume increases the efficiency of the quotient between resistance to compression and thermal conductivity. On the other hand, increasing the volume of air does not ensure greater efficiency either. Concrete 1 has a lower air content than concrete 2, but a greater volume of air for pore sizes smaller than 40 μm. This results in concrete 1 having greater compressive strength and lower thermal conductivity than concrete 2.

On the other hand, concrete 3 is the only one of these examples that meets the requirements of lightweight structural concretes, since quotient Qσ/ρ is greater than or equal to 25.

TABLE 3

| | Concrete | | | | |
|---|---|---|---|---|---|
| | 1 | 2 | 3 | 4 | 5 |
| Fresh density (t/m³) | 0.94 | 0.95 | 1.18 | 1.12 | 1.31 |
| Dry hardened density (t/m³) | 0.76 | 0.78 | 0.86 | 0.82 | 1.21 |
| Resistance to cylindrical compression, 28 days (MPa) | 13.1 | 8.1 | 22.8 | 17.5 | 12.9 |
| Dry thermal conductivity (W/mK) | 0.17 | 0.19 | 0.24 | 0.23 | 0.44 |
| Thermal conductivity equilibrium (W/mK) | 0.20 | 0.22 | 0.27 | 0.26 | 0.52 |
| Added air content (%) | 52.7% | 57.7% | 45.0% | 44.8% | 45.2% |
| Thermal conductivity resistance ratio Qσ/λ ((MPa * m * K)/W) | 77 | 43 | 95 | 76 | 29 |
| Reason for resistance to dry density Qσ/ρ (MPa/(kg/m³)) | 17 | 10 | 27 | 21 | 11 |

Table 4 shows the properties of the cementitious matrices used in the sample concretes. The concrete 1 has a matrix A, the concretes 2, 3 and 4 have the matrix B and the concrete 5 has the matrix C.

TABLE 4

| | Agglomerating Matrix | | |
|---|---|---|---|
| | A[1] | B[2] | C[3] |
| Dose Cement (kg/m³) | 608 | 751 | 1392 |
| Dosage Ash Flywheel (kg/m³) | 686 | 452 | 0 |
| Microsilica dose (kg/m³) | 0 | 105 | 0 |
| Water dose (kg/m³) | 518 | 523 | 557 |
| CH (%) | 7.0 | 8.8 | 17.2 |
| CSH (%) | 20.9 | 26.8 | 47.1 |
| CSH/CH | 3.04 | 2.98 | 2.75 |
| Fresh density (t/m³) | 1.81 | 1.83 | 1.95 |
| Dry hardened density (t/m³) | 1.68 | 1.70 | 1.81 |
| Cylindrical compressive strength at 28 days (MPa) | 45.6 | 62.0 | 73.1 |
| Dry thermal conductivity (W/mK) | 0.43 | 0.45 | 0.68 |
| Thermal conductivity at 23° C. and 50% RH (W/mK)2 | 0.49 | 0.52 | 0.78 |
| Quotient thermal conductivity resistance Qσ/λ ((MPa * m * K)/W) | 105 | 138 | 107 |

[1]Binding matrix present in mixture 1 of Table 2
[2]Binding matrix present in mixture 2, 3 and 4 of Table 2
[3]Binding matrix present in mixture 5 of Table 2

In Table 4 it can be seen that, using the design method of the present disclosure, the binding matrices A and B comply with a maximum percentage of CH volume in the binding matrix under 10%.

The invention claimed is:

1. A method of manufacturing a structural, lightweight, low thermal conductivity concrete, the method comprising:
   a. providing aggregates and a dosage of a binding matrix for the concrete, the dosage including a water/cementitious matrix material mixture with a ratio of water to cementitious matrix material in a range from approximately 0.2 to approximately 0.7;

b. performing an analysis of a plurality of lightweight aggregates by size fraction to determine a pore size distribution of each fraction of a plurality of fractions;
c. performing an analysis of the binding matrix to determine a content of calcium hydroxide (CH) and a pore volume of the binding matrix;
d. defining absolute and relative aggregate fractions according to the following function of pore sizes:
for pore sizes of up to 10 μm, defining a minimum volume fraction of distributed air to be approximately 15% and defining a minimum fraction of accumulated air content to be approximately 10%;
for pore sizes of up to 40 μm, defining a minimum volume fraction of distributed air to be approximately 50% and defining a minimum fraction of cumulative air to be approximately 20%;
for pore sizes of up to 100 μm, defining a minimum volume fraction of distributed air to be approximately 75% and defining a minimum fraction of cumulative air to be approximately 30%;
for pore sizes of up to 200 μm, defining a minimum volume fraction of distributed air to be approximately 90% and defining a minimum fraction of cumulative air to be approximately 40%;
for pore sizes of up to 300 μm, defining a minimum volume fraction of distributed air to be approximately 100% and defining a minimum fraction of cumulative air to be approximately 43%;
e. determining whether the following criteria are met based on the analysis performed in stages b) and c):
i. a total volume fraction of air in the lightweight aggregates is in a range from approximately 50% to approximately 99%;
ii. a total volume fraction of air in the concrete provided by the light aggregates is in a range from approximately 25% to approximately 75%;
iii. a volume fraction of binding matrix is 50% or less of a total volume of the concrete;
iv. a total volume of pores in the binding matrix is in a range from approximately 10% to approximately 30% of a total volume of the matrix;
v. a maximum volume fraction of calcium hydroxide (CH) in the binding matrix is approximately 10%;
f. when these criteria are not met, repeating stages a) to e), and when these criteria are met, selecting the aggregates analyzed and the dosage for the binding matrix analyzed as the selected components of light structural concrete and with low thermal conductivity; and
g. manufacturing a concrete with said selected aggregates and said matrix selected according to said dosage.

2. The method according to claim 1, wherein the analysis of the lightweight aggregates in stage b) is performed by measuring a porosity distribution using computed tomography.

3. The method according to claim 1, wherein the analysis of the binding matrix in step c) in which a content of calcium hydroxide (CH) and pore volume is determined, further comprises:
performing simulations to determine a content of hydration products; and
performing XRD, XRF and/or TGA measurements on samples of candidate binding matrices.

4. The concrete manufacturing method according to claim 1, wherein a largest lightweight aggregate fraction, in size, is at least twice the size of a smallest lightweight aggregate fraction.

5. The method according to claim 1, wherein the aggregates provided in step a) include amorphous components and the analysis in stage b) further comprises:
measuring the pore size distribution of each fraction of amorphous components;
performing computed tomography measurements to determine the porosity distribution of amorphous components; and
measuring thermal conductivity of amorphous components.

6. The method according to claim 5, wherein in stage e) a further criterion includes specifying that the thermal conductivity of the amorphous components is less than 0.2 W/mK.

7. A method of manufacturing structural and lightweight concretes, the method comprising:
a. providing aggregates and a dosage of a binding matrix for the concrete, said dosage including a mixture of water and matrix cementitious material in a ratio of water to matrix cementitious material in a range from approximately 0.2 to approximately 0.5;
b. providing an analysis of a plurality of lightweight aggregates by size fraction to determine a pore size distribution of each fraction;
c. measuring a mechanical strength of the binding matrix;
d. defining absolute and relative aggregate fractions according to the following function of pore sizes:
for pore sizes of up to 10 μm, defining a minimum volume fraction of distributed air to be approximately 15%;
for pore sizes of up to 40 defining a minimum volume fraction of distributed air to be approximately 50%;
for pore sizes of up to 100 μm, defining a minimum volume fraction of distributed air to be approximately 75%;
for pore sizes of up to 200 μm, defining a minimum volume fraction of distributed air to be approximately 90%;
for pore sizes of up to 300 μm, defining a minimum volume fraction of distributed air to be approximately 100%;
e. determining whether the following criteria are met based on the analysis performed in stages b) and c):
i. a total volume fraction of air in selected lightweight aggregates is in a range from approximately 30% to approximately 99%;
ii. a total volume fraction of air in the concrete provided by the lightweight aggregates is in a range from approximately 15% to approximately 75%;
iii. a volume fraction of binding matrix is 50% or less of a total volume of the concrete;
f. when these criteria are not met, repeating steps a) to e), and when these criteria are met, selecting the aggregates analyzed and the dosage for the binding matrix analyzed as the selected components of the lightweight concrete; and
g. manufacturing a concrete with said selected aggregates, said selected matrix and said dosage.

8. The method according to claim 7, wherein the analysis of the lightweight aggregates in stage b) is performed by measuring a porosity distribution by computed tomography.

9. The method according to claim 7, wherein the aggregates provided in step a) include amorphous components and the analysis in stage b) further comprises:
measuring the pore size distribution of each fraction of amorphous components by performing computed tomography measurements to determine a porosity distribution; and measuring thermal conductivity of amorphous components.

10. The method according to claim 9, wherein in stage e) a further criterion includes specifying that the thermal conductivity of the amorphous components is less than 0.2 W/mK.

11. A structural and light concrete, comprising:
 a) a binding matrix component having a volume fraction from approximately 20% to approximately 50% of a concrete total volume, the binding matrix component comprising:
  i. a Portland Type I, II, III, IV or V cement or a mixture thereof, according to ASTM C 150 standard, in a dose of at least 100 kg/m³ of concrete;
  ii. supplementary cementitious materials in a proportion of up to 4 times by volume of Portland cement;
  iii. a water component having a volume fraction relative to cement and supplementary cementitious materials in a range from approximately 0.2 to approximately 0.7;
  iv. a maximum volume fraction of calcium hydroxide (CH) of approximately 10%; and
 b) light aggregates corresponding to a volume fraction a range from approximately 30% to approximately 80% of the total volume of the concrete,
 wherein the concrete has a compression resistance, after 28 days of age, of at least 10 MPa, a density lower than 1.4 t/m³, a thermal conductivity lower than 0.288 W/(m*K) at 23° C. and 50% of relative humidity, and a quotient of density resistance $Q\sigma/p$ of at least 17 (MPa*m³/t).

12. The concrete of claim 11, wherein the concrete has a compression resistance, after 28 days of age, of at least 13 MPa.

13. The concrete of claim 11, wherein the concrete has a thermal conductivity less than 0.185 W/(m*K) at 23° C. and 50% of relative humidity.

14. The concrete of claim 11, wherein the concrete has a quotient of density resistance $Q\sigma/p$ of at least 25 (MPa*m³/t).

15. The concrete of claim 11, wherein the concrete has a low thermal conductivity and has a conductivity resistance quotient of at least $Q\sigma/T$, =60 (MPa*m*K)/W.

16. The concrete of claim 15, wherein the concrete has a conductivity resistance quotient of at least $Q\sigma/\lambda$=70 (MPa*m*K)/W.

* * * * *